US009554175B2

United States Patent
Eyer

(10) Patent No.: US 9,554,175 B2
(45) Date of Patent: Jan. 24, 2017

(54) METHOD, COMPUTER PROGRAM, RECEPTION APPARATUS, AND INFORMATION PROVIDING APPARATUS FOR TRIGGER COMPACTION

(75) Inventor: Mark Eyer, Woodinville, WA (US)

(73) Assignee: Sony Corporation, Tokyo (JP)

( * ) Notice: Subject to any disclaimer, the term of this patent is extended or adjusted under 35 U.S.C. 154(b) by 552 days.

(21) Appl. No.: 13/490,216

(22) Filed: Jun. 6, 2012

(65) Prior Publication Data

US 2013/0024894 A1 Jan. 24, 2013

Related U.S. Application Data

(60) Provisional application No. 61/509,679, filed on Jul. 20, 2011, provisional application No. 61/531,360, (Continued)

(51) Int. Cl.
*H04N 21/435* (2011.01)
*H04N 21/433* (2011.01)
(Continued)

(52) U.S. Cl.
CPC ............ *H04N 21/435* (2013.01); *H04H 60/13* (2013.01); *H04N 21/433* (2013.01);
(Continued)

(58) Field of Classification Search
None
See application file for complete search history.

(56) References Cited

U.S. PATENT DOCUMENTS 5,818,935 A 10/1998 Maa
6,373,534 B1 4/2002 Yasuki et al.
(Continued)

FOREIGN PATENT DOCUMENTS

JP 11-27641 A 1/1999
JP 2003-308328 A 10/2003
(Continued)

OTHER PUBLICATIONS

International Search Report and Written Opinion issued May 17, 2013 in PCT/US2013/030646 filed Mar. 13, 2013 submitting English translation only.
(Continued)

*Primary Examiner* — Omar S Parra
(74) *Attorney, Agent, or Firm* — Oblon, McClelland, Maier & Neustadt, L.L.P.

(57) ABSTRACT

A method, computer program, and reception apparatus, and information providing apparatus. The method includes receiving a trigger parameters table (TPT). The TPT is associated with a triggered declarative object (TDO) and includes at least one parameter associated with a trigger event. The TPT is stored in a first memory of the reception apparatus. The TDO is executed by a processor of the reception apparatus and is stored in a second memory of the reception apparatus. The reception apparatus receives a trigger associated with the trigger event. At least one parameter associated with the trigger event is retrieved from the TPT based on information included in the trigger. Further, a function is performed based on the retrieved at least one parameter.

24 Claims, 9 Drawing Sheets

Related U.S. Application Data filed on Sep. 6, 2011, provisional application No. 61/613,869, filed on Mar. 21, 2012, provisional application No. 61/613,880, filed on Mar. 21, 2012, provisional application No. 61/636,488, filed on Apr. 20, 2012.

(51) Int. Cl.

| | | |
|---|---|---|
| *H04N 21/434* | (2011.01) | |
| *H04N 21/462* | (2011.01) | |
| *H04H 60/13* | (2008.01) | |
| *H04N 21/44* | (2011.01) | |
| *H04N 21/488* | (2011.01) | |
| *H04N 21/61* | (2011.01) | |
| *H04N 21/8543* | (2011.01) | |

(52) U.S. Cl.
CPC ... *H04N 21/4348* (2013.01); *H04N 21/44008* (2013.01); *H04N 21/4622* (2013.01); *H04N 21/4888* (2013.01); *H04N 21/6112* (2013.01); *H04N 21/6118* (2013.01); *H04N 21/6125* (2013.01); *H04N 21/6143* (2013.01); *H04N 21/8543* (2013.01)

(56) References Cited

U.S. PATENT DOCUMENTS

| | | |
|---|---|---|
| 7,028,327 B1 | 4/2006 | Dougherty et al. |
| 7,889,964 B1* | 2/2011 | Barton et al. ............... 386/241 |
| 2001/0046069 A1 | 11/2001 | Jones |
| 2002/0033844 A1 | 3/2002 | Levy et al. |
| 2002/0062382 A1 | 5/2002 | Rhoads et al. |
| 2002/0124249 A1 | 9/2002 | Shintani et al. |
| 2002/0162120 A1 | 10/2002 | Mitchell |
| 2003/0093792 A1 | 5/2003 | Labeeb et al. |
| 2003/0187798 A1 | 10/2003 | McKinley et al. |
| 2003/0195021 A1 | 10/2003 | Yamashita et al. |
| 2005/0005303 A1 | 1/2005 | Barone, Jr. et al. |
| 2005/0192933 A1 | 9/2005 | Rhoads et al. |
| 2005/0262539 A1 | 11/2005 | Barton et al. |
| 2007/0022437 A1 | 1/2007 | Gerken |
| 2007/0055689 A1 | 3/2007 | Rhoads et al. |
| 2007/0124796 A1 | 5/2007 | Wittkotter |
| 2008/0049971 A1 | 2/2008 | Ramos et al. |
| 2008/0082618 A1 | 4/2008 | Jones |
| 2008/0275906 A1 | 11/2008 | Rhoads et al. |
| 2009/0034556 A1 | 2/2009 | Song et al. |
| 2009/0138484 A1 | 5/2009 | Ramos et al. |
| 2009/0320064 A1 | 12/2009 | Soldan et al. |
| 2009/0320073 A1 | 12/2009 | Reisman |
| 2010/0134701 A1 | 6/2010 | Eyer |
| 2010/0146376 A1 | 6/2010 | Reams |
| 2010/0162307 A1 | 6/2010 | Suh et al. |
| 2010/0186042 A1 | 7/2010 | Roop et al. |
| 2010/0215340 A1 | 8/2010 | Pettit et al. |
| 2011/0010737 A1 | 1/2011 | Bouazizi et al. |
| 2011/0075990 A1 | 3/2011 | Eyer |
| 2011/0088075 A1 | 4/2011 | Eyer |
| 2011/0128443 A1 | 6/2011 | Blanchard et al. |
| 2011/0221863 A1 | 9/2011 | Eyer |
| 2011/0243536 A1 | 10/2011 | Eyer |
| 2011/0246488 A1 | 10/2011 | Eyer |
| 2011/0247028 A1 | 10/2011 | Eyer |
| 2011/0298981 A1 | 12/2011 | Eyer |
| 2011/0299827 A1 | 12/2011 | Eyer |
| 2011/0302599 A1 | 12/2011 | Eyer |
| 2011/0302611 A1 | 12/2011 | Eyer |
| 2011/0307920 A1 | 12/2011 | Blanchard et al. |
| 2012/0044418 A1 | 2/2012 | Eyer |
| 2012/0047531 A1 | 2/2012 | Eyer |
| 2012/0050619 A1 | 3/2012 | Kitazato et al. |
| 2012/0050620 A1 | 3/2012 | Kitazato |
| 2012/0054214 A1 | 3/2012 | Yamagish et al. |
| 2012/0054235 A1 | 3/2012 | Kitazato et al. |
| 2012/0054267 A1 | 3/2012 | Yamagishi et al. |
| 2012/0054268 A1 | 3/2012 | Yamagishi |
| 2012/0054783 A1 | 3/2012 | Yamagish |
| 2012/0054784 A1 | 3/2012 | Kitazato et al. |
| 2012/0054816 A1 | 3/2012 | Dewa |
| 2012/0060197 A1 | 3/2012 | Kitahara et al. |
| 2012/0063508 A1 | 3/2012 | Hattori et al. |
| 2012/0072965 A1 | 3/2012 | Dewa |
| 2012/0081508 A1 | 4/2012 | Kitazato |
| 2012/0081607 A1 | 4/2012 | Kitazato |
| 2012/0082266 A1 | 4/2012 | Kitazato et al. |
| 2012/0082440 A1 | 4/2012 | Kitazato |
| 2012/0084802 A1 | 4/2012 | Kitazato |
| 2012/0084824 A1 | 4/2012 | Kitazato |
| 2012/0084829 A1 | 4/2012 | Kitazato |
| 2012/0236113 A1 | 9/2012 | Eyer |
| 2013/0024897 A1 | 1/2013 | Eyer |
| 2014/0130077 A1* | 5/2014 | Oostveen et al. ............... 725/20 |

FOREIGN PATENT DOCUMENTS

| | | |
|---|---|---|
| JP | 2010-182323 A | 8/2010 |
| WO | EP 1 380 945 | 1/2004 |
| WO | WO 2005/006758 | 1/2005 |
| WO | WO 2011/066171 A2 | 6/2011 |
| WO | WO 2011/074218 A2 | 6/2011 |
| WO | WO 2013/012676 | 1/2013 |

OTHER PUBLICATIONS

International Search Report and Written Opinion issued Jun. 17, 2013 in PCT/US2013/036075 filed Apr. 11, 2013 submitting English translation only.
The International Search Report and The Written Opinion issued Oct. 5, 2012, in International application No. PCT/US12/46663.
International Search Report and Written Opinion of the International Searching Authority Issued May 31, 2013 in PCT/US13/33133.
U.S. Appl. No. 13/422,203, filed Mar. 16, 2012, Kitazato, et al.
U.S. Appl. No. 13/009,720, filed Jan. 19, 2011, Eyer, et al.
U.S. Appl. No. 13/304,126, filed Nov. 23, 2011, Eyer.
U.S. Appl. No. 13/452,376, filed Apr. 20, 2012, Kitahara, et al.
International Search Report issued Sep. 25, 2012 in PCT/JP2012/071969 filed Aug. 30, 2012.
International Search Report and Written Opinion issued Oct. 5, 2012 filed Jul. 12, 2012 in PCT/US 12/46454.
Office Action issued Apr. 21, 2015, in Chinese Patent Application No. 201280026304.4 (with English translation).
Extended European Search Report issued Jun. 22, 2015 in European Application No. 12814551.3.
Extended European Search Report issued Jun. 30, 2015 in European Application No. 12814180.1.
Extended European Search Report issued Jul. 27, 2015 in European Application No. 13764907.5.
Extended European Search Report issued Nov. 3, 2015 in Patent Application No. 13777548.2.
Extended European Search Report issued Oct. 12, 2015 in Patent Application No. 13765058.6.
Extended Search Report issued Mar. 12, 2015 in European Patent Application No. 12829741.3.

* cited by examiner

METHOD, COMPUTER PROGRAM, RECEPTION APPARATUS, AND INFORMATION PROVIDING APPARATUS FOR TRIGGER COMPACTION

CROSS-REFERENCE TO RELATED APPLICATIONS

This application is related to and claims priority under 35 U.S.C. §119(e) to U.S. provisional patent application No. 61/509,679, filed Jul. 20, 2011, which is incorporated herein by reference in its entirety. The present application is also related to and claims priority under 35 U.S.C. §119(e) to U.S. provisional patent application No. 61/531,360, filed Sep. 6, 2011; U.S. provisional patent application No. 61/613,869, filed Mar. 21, 2012; U.S. provisional patent application No. 61/613,880, filed Mar. 21, 2012; and U.S. provisional patent application No. 61/636,488, filed Apr. 20, 2012, which are incorporated herein by reference in their entirety.

BACKGROUND OF THE INVENTION

1. Field of the Invention

Embodiments described herein relate generally to a method, computer program, reception apparatus, and information providing apparatus for trigger compaction. More particularly, the embodiments described herein relate generally to reducing the size of a trigger.

2. Background

Modern televisions and set top boxes are capable of performing numerous functions in addition to receiving and presenting television broadcasts. Some functions include the display of an electronic programming guide (EPG), widgets that allow a television viewer to pull up web pages and tools right alongside programs being watched on a television, and the like. Many of these functions require that the television or set top box receive additional data. For example, in the case of the EPG, the television or set top box would need to receive program information.

In some cases the additional data is provided along with the television broadcast. When the additional data is provided in this manner the amount of data that can be provided is often limited. As a result, it may be necessary to reduce the amount of additional data provided along with the television broadcast or obtain the additional data from another source.

SUMMARY OF THE INVENTION

According to an embodiment of the present invention, there is provided a method of a reception apparatus for processing triggers. The method includes receiving a trigger parameters table (TPT). The TPT is associated with a triggered declarative object (TDO) and includes at least one parameter associated with a trigger event. The received TPT is stored in a first memory of the reception apparatus. A TDO stored in a second memory of the reception apparatus is executed by a processor of the reception apparatus. The reception apparatus receives a trigger associated with the trigger event. The at least one parameter associated with the trigger event is retrieved based on information included in the trigger. Further, a function is performed based on the retrieved at least one parameter from the TPT.

Further, according to an embodiment of the present invention, there is provided a computer-readable storage medium having instructions embedded therein, which, when executed by a computer, cause the computer to perform the method of the reception apparatus, as discussed above.

According to an embodiment of the present invention, there is provided a reception apparatus. The reception apparatus includes first and second communication units, first and second memories, and a processor. The first communication unit is configured to receive a trigger parameters table (TPT). The TPT is associated with a triggered declarative object (TDO) and includes at least one parameter associated with a trigger event. The first memory is configured to store the TPT. The second memory is configured to store the TDO, which is executed by the processor. The second communication unit is configured to receive a trigger associated with the trigger event. When the second communication unit receives the trigger, the processor retrieves the at least one parameter associated with the trigger event from the TPT based on information included in the trigger, and performs a function based on the retrieved at least one parameter.

According to an embodiment of the present invention, there is provided an information providing apparatus, which includes a memory and a communication unit. The memory is configured to store a trigger parameters table (TPT). The TPT is associated with a triggered declarative object (TDO) and includes at least one parameter associated with a trigger event. Further, the communication unit is configured to provide the TPT to a reception apparatus.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
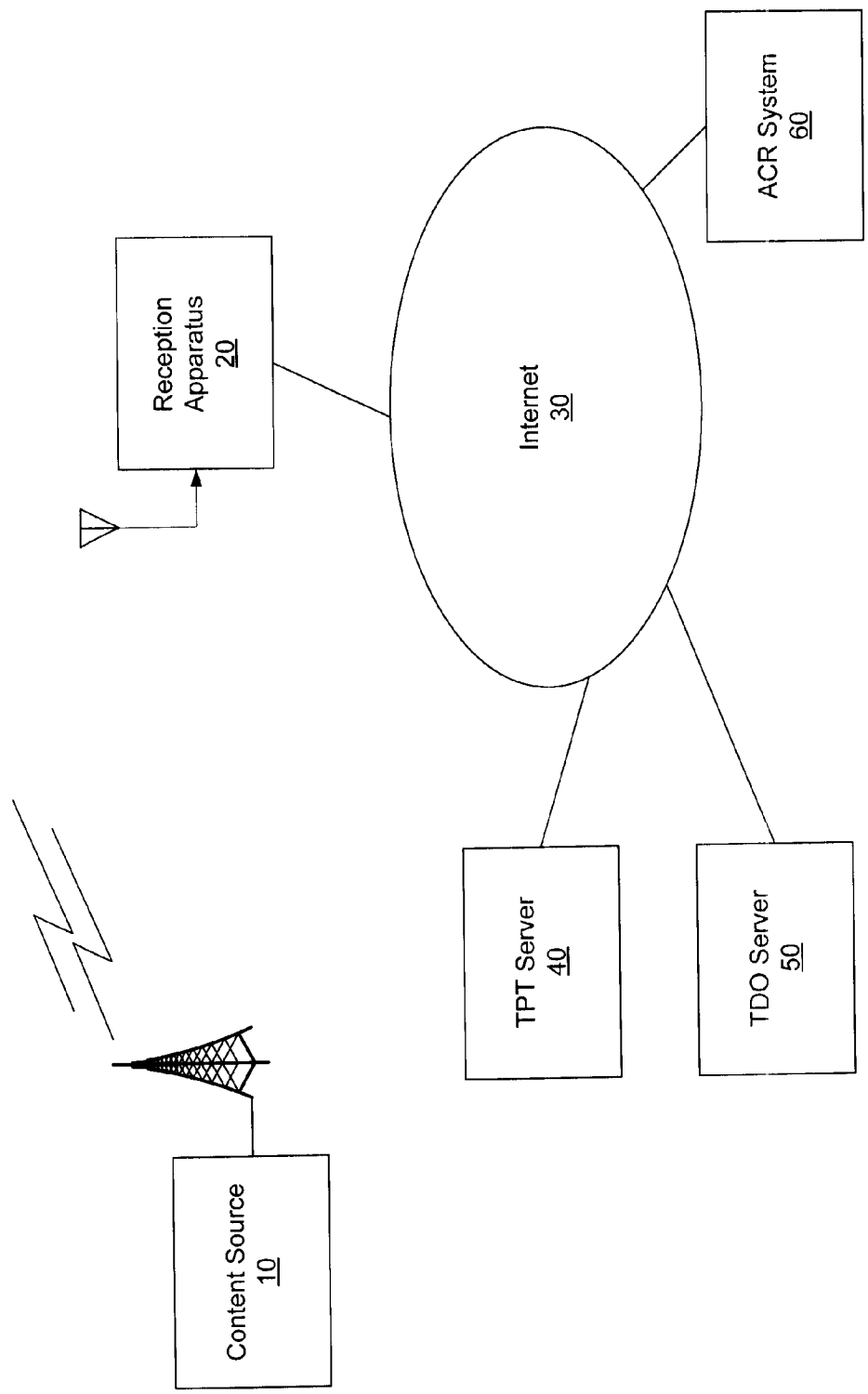
FIG. 1 illustrates an exemplary broadcast system including a content source, reception apparatus, trigger parameters table (TPT) server, triggered declarative object (TDO) server, and an automatic content recognition (ACR) system.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

In interactive television applications, viewers are offered extra (i.e., supplemental) content, in addition to the program audio and video, that allows them to interact with the programming in some way. The extra content could be as simple as an Internet uniform resource locator (URL) that points to a website that can provide further information about the program, item, or service being shown. Or, an interactive element could provide text and/or graphics that augment the program video. An example of the latter is an element that displays a particular player's updated statistics during the course of a sporting event.

Often, the behavior or appearance/disappearance of these interactive elements is dependent on the timing of events within the program. Television receivers which are rendering these objects must be able to receive the appropriate signaling to know how and when to make the adjustments to the display of the interactive elements. The objects which perform this signaling function may be called "triggers" because they act to trigger a certain operation at the designated time. The varieties of operations that may be triggered are endless. Simple examples include such things as "execute" (start the operation of the interactive function), "hide" (remove all visible elements from the display), perform some designated action such as display or update some text or graphic, and "terminate" (end all operations and release memory resources).

The trigger itself must be transported from the point in the distribution chain at which the interactive element is sourced and operated all the way to the consumer's receiver. A variety of transport methods are possible for the trigger object. The trigger can be included in the digital transport multiplex in a variety of different locations, or it can be provided by an Internet-based server and accessed by receivers that are Internet-connected. Possible locations in the digital transport include in video or audio "user data," within the closed captioning transport, within a descriptor carried in a program specific information (PSI) table, within adaptation fields of the MPEG-2 Transport Stream packet, embedded in audio, and modulated within the video itself in luminance or chrominance. In each case, smaller triggers are preferable. E.g. a trigger that can be represented in as few as 30 bytes (or characters of text) offers greater flexibility in transport and greater efficiency compared to one whose size might be 100 or more bytes. In embodiments of the present invention, a method for providing interactivity is described in which the trigger function is accomplished using a small or "compact" trigger.

Referring now to the drawings, FIG. 1 is a block diagram that shows an exemplary broadcast system 2, including a content source 10, a reception apparatus 20 (e.g., a digital television receiver device), a trigger parameters table (TPT) server 40, a triggered declarative object (TDO) server 50, and an optional automatic content recognition (ACR) system 60. The reception apparatus 20 accesses the TPT server 40, TDO server 60, and/or ACR system 60 via one or more communication networks such as the Internet 30. In other embodiments, TPTs stored in the TPT server 40 and/or the TDOs stored in the TDO server 60 are provided to the reception apparatus 20 by the content source 10 or the ACR system 60.

The broadcast system 2 provides an interactive digital television feature whereby a viewer is presented with supplemental content that is associated with, and synchronized in time to events within, content provided by the content source 10. The supplemental content includes one or a combination of media types such as audio, video, text, or an image, and/or one or more interactive elements. In one embodiment, the behavior and appearance of the supplemental content is associated with, and synchronized in time to the events within, the content.

In one embodiment, the content source 10 provides content to the reception apparatus 20 via a terrestrial broadcast. In other embodiments, the content source 10 provides the content via at least one of a satellite broadcast, a cable television transmission, a terrestrial television broadcast, cellular network, and data communication network such as a local area network (LAN), wide area network (WAN), or the Internet 30. The content provided by the content source 10 includes one or more television programs, without regard to whether the content is a movie, sporting event, segment of a multi-part series, news broadcast, etc. Further, the content provided by the content source 10 may also include advertisements, infomercials, and other program-like content which may not be reported as a program in an EPG.

Figure 3:
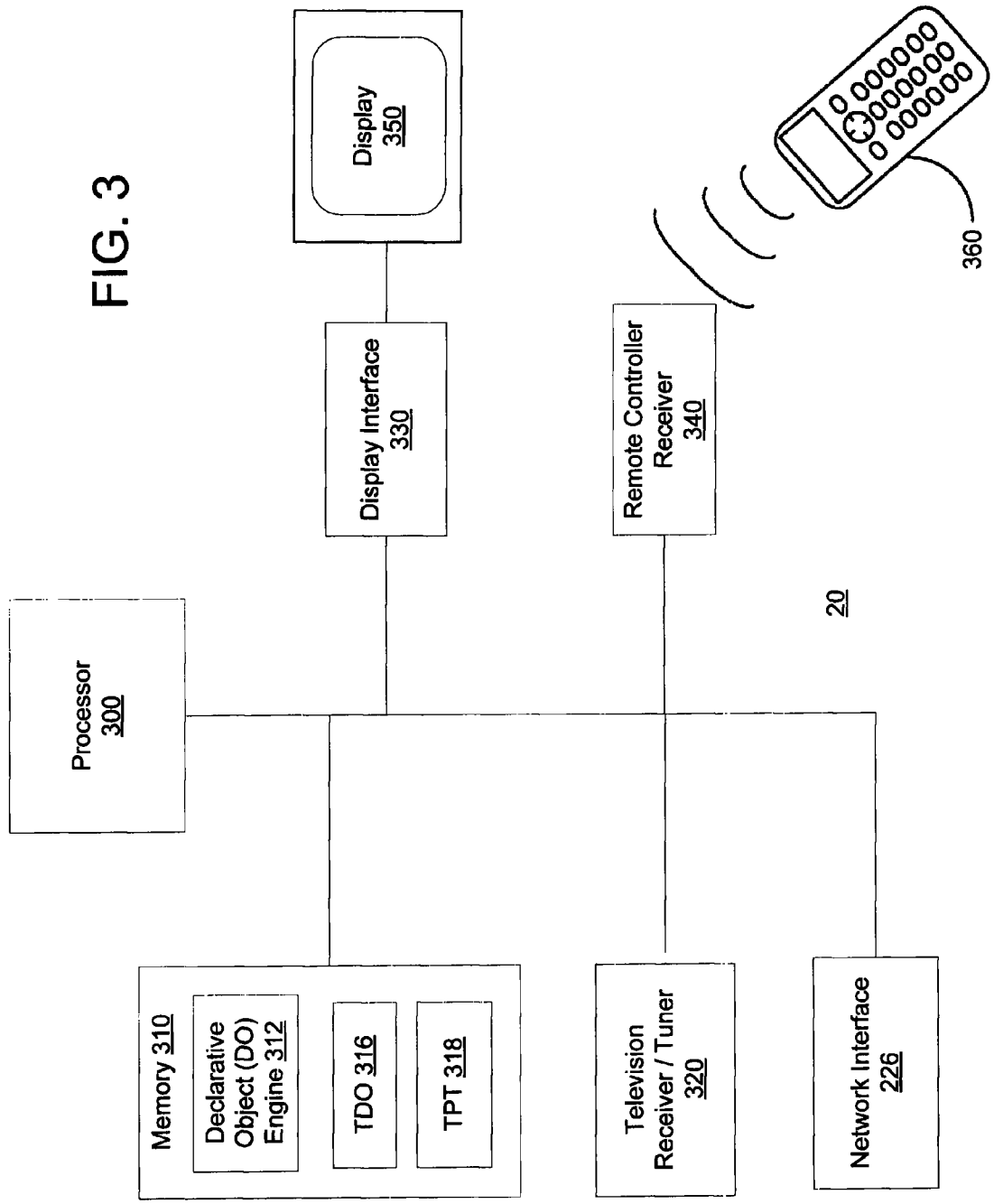
FIG. 3 is a processor-centric block diagram of an exemplary reception apparatus.

The reception apparatus 20 receives the content provided by the content source 10 and displays the content on a display 350, illustrated in FIG. 3. In one embodiment, the display 350 is an integral part of the reception apparatus 20 such as a television set. Alternatively, the display 350 may be external to the reception apparatus 20 such as a television set connected to a set top box.

According to one embodiment, the reception apparatus 20 includes a Declarative Object (DO) Engine that accepts declarative objects (DOs) and renders them along with the content (e.g., audio/video content of a program) received from the content source 10. The DO Engine renders a DO in response a specific request from a user or in response to a trigger event. A DO that is rendered in response to a trigger event is referred to as a triggered declarative object (TDO).

The TDO is a downloadable software object created by a content provider, content creator, or service provider, which includes declarative content (e.g., text, graphics, descriptive markup, scripts, and/or audio) whose function is tied in some way to the content it accompanies. An embodiment of the TDO is described in U.S. application Ser. No. 12/959,529 filed Dec. 3, 2010 entitled "Announcement of Triggered Declarative Objects" to Blanchard et al. which is hereby incorporated by reference in its entirety. However, the TDO is not limited to the structure described in Blanchard et al. since many attributes defined therein as being a part of a TDO could be situated in a trigger or vice versa or not present at all depending upon the function and triggering of a particular TDO.

The TDO is generally considered as "declarative" content to distinguish it from "executable" content such as a Java applet or an application that runs on an operating system platform. Although the TDO is usually considered to be a declarative object, a TDO player (e.g., the DO Engine) supports a scripting language that is an object-oriented programming language. The TDOs, in examples shown herein, are received from a content or service provider in advance of the time they are executed so that the TDO is available when needed. Moreover, an explicit trigger signal may not be necessary and a TDO may be self-triggering or triggered by some action other than receipt of a trigger signal. Various standards bodies may define associated behaviors, appearances, trigger actions, and transport methods for content and metadata for a TDO. Additionally, requirements regarding timing accuracy of TDO behaviors relative to audio/video may be defined by standards bodies.

The trigger is a data object, which is optionally bound to a particular item of content (e.g., a television program) that references a specific TDO instance, by the use of a file name or identifier for an object that is to be downloaded (e.g., when instructing download of the TDO) or has already been downloaded (e.g., when instructing execution, suspension, termination, etc. of the TDO). Certain TDOs will only make sense in conjunction with certain content. An example is a TDO that collects viewer response data, such as voting on a game show or contest.

In one embodiment, the DO Engine receives triggers tied to coincide with various points (e.g., trigger events) in the content such as a scene change or the beginning or ending of an ad segment. The triggers are divided into two types: (1) those that are processed by the DO Engine, and (2) those that are passed by the DO Engine to the TDO for processing. The triggers associated with a type 1 command are associated with, for example, commands to be executed by the DO Engine. The triggers associated with a type 2 command are associated, for example, with parameters (e.g., commands, data, etc.) to be processed within the DO itself to effect changes in appearance, behavior, or state of associated supplemental content.

A trigger may be transported within a broadcast emission stream as described, for example, in U.S. patent application Ser. No. 13/216,375, which is incorporated herein by reference in its entirety. For example, a trigger may be transported in a Packetized Elementary Stream (PES) in an MPEG-2 Transport Stream (TS), or within the DTV closed caption stream, as described in U.S. provisional application No. 61/613,869, filed Mar. 21, 2012. A trigger may also be transported via other paths such as the Internet. In one embodiment, when the trigger is not available via the broadcast emission stream, the reception apparatus 20 acquires the trigger via the ACR system 60 by, for example, sending A/V samples of the content being received by the reception apparatus 20 to the ACR system 60. In other embodiments, the trigger is embedded in the content itself. For example, the trigger may be embedded in an audio or a video portion of the content and recovered by processing of the decoded audio or the video in the reception apparatus 20.

For some methods of transporting the trigger, smaller sized objects are preferred. In such a case, the trigger should be able to be represented within a small number of bits or bytes. Further, some transport methods may limit the maximum size of the trigger to a fixed number of bytes.

Embodiments of the present invention provide some approaches to a system design in which the trigger itself can be represented within a small number of bytes, in order to facilitate convenient and robust transport. The representation of the trigger in a small number of bytes addresses issues such as a need for small, compact, and robust triggers for transport methods with limited data carrying capacity; and a need to accommodate variable-sized payloads, which are often awkward to transport. Some embodiments of the present invention also address the desire to offer a flexible system in which the TDO can be "table-driven" (e.g., its actions and behavior are specified by data in an associated table, rather than being coded into the TDO itself). This allows a single TDO script to be usable in a variety of situations.

The use of small-sized triggers is desirable over interfaces such as a High-Definition Multimedia Interface (HDMI) in which, for example, the trigger may need to be encoded in other signals communicated over those interfaces.

To reduce the size of the trigger, a subset or all of the parameters associated with the trigger are provided to the reception apparatus 20 separately, instead of being included in the trigger itself. In one embodiment, the one or more parameters associated with the trigger are provided to the reception apparatus 20 in a TPT provided by the TPT server 40. In another embodiment, the TPT may be provided with EPG data. The TPTs stored in the TPT server 40 may be pushed to, or pulled (e.g., polling) by, the reception apparatus 20. In some embodiments, the TPT can be provided by other sources via the Internet such as the ACR system 60 or other methods of transport such as the broadcast emission. The TPT may be represented in XML, although any other representations may be used.

An exemplary XML schema of a TPT is defined below:

```
<?xml version="1.0" encoding="UTF-8"?>
<xs:schema xmlns:tpt="urn:atsc2.0" xmlns:xs="http://www.w3.org/2001/XMLSchema"
targetNamespace="urn:atsc2.0" elementFormDefault="qualified" attributeFormDefault="unqualified">
    <xs:element name="TPT">
        <xs:complexType>
            <xs:sequence>
                <xs:element name="command" type="tpt:CommandType" maxOccurs="unbounded"/>
            </xs:sequence>
            <xs:attribute name="id" type="xs:ID"/>
            <xs:attribute name="type" type="xs:string" default="static"/>
            <xs:attribute name="version" type="xs:string" use="optional"/>
            <xs:attribute name="updating_time" type="xs:string" use="optional"/>
            <xs:attribute name="present_following" type="xs:string" use="optional" default="present"/>
            <xs:attribute name="end_mt" type="xs:time" use="optional"/>
            <xs:attribute name="expire_date" type="xs:dateTime" use="optional"/>
        </xs:complexType>
    </xs:element>
    <xs:complexType name="CommandType">
        <xs:sequence>
            <xs:element name="application" type="tpt:ApplicationType"/>
            <xs:element name="event" type="tpt:EventType" minOccurs="0"/>
            <xs:element name="diffusion" type="tpt:DiffusionType" minOccurs="0"/>
        </xs:sequence>
        <xs:attribute name="id" type="xs:ID"/>
        <xs:attribute name="start_time" type="xs:time" use="optional"/>
        <xs:attribute name="end_time" type="xs:time" use="optional"/>
        <xs:attribute name="destination" type="xs:string" use="optional" default="receiver"/>
        <xs:attribute name="action" type="xs:string"/>
    </xs:complexType>
    <xs:complexType name="ApplicationType">
        <xs:attribute name="id" type="xs:ID"/>
        <xs:attribute name="type" type="xs:string"/>
```

```
            <xs:attribute name="url" type="xs:anyURI" use="optional"/>
            <xs:attribute name="priority" type="xs:boolean" use="optional" default="0"/>
            <xs:attribute name="expire_date" type="xs:dateTime" use="optional"/>
        </xs:complexType>
        <xs:complexType name="EventType">
            <xs:sequence>
                <xs:element name="data" type="xs:string" minOccurs="0"/>
            </xs:sequence>
            <xs:attribute name="id" type="xs:ID"/>
        </xs:complexType>
        <xs:complexType name="DiffusionType">
            <xs:attribute name="period" type="xs:duration"/>
        </xs:complexType>
</xs:schema>
```

The TPT includes a primary key (e.g., a tag element, media time, etc.) that associates each element (row) in the table with an associated trigger event. Each trigger, in turn, will refer to a particular event in the TPT by means of this key.

In one embodiment, the reception apparatus 20 is configured to receive updated versions of a TPT when available. The capability to receive an updated version of the TPT provides increased flexibility in providing trigger events when it is difficult to determine the exact timing of trigger events ahead of time, such as in the case of live programming. During the live programming, the TPT can be updated to include timing information once it has been determined. For example, updated versions of the TPT may include modified or new timing information associated with a trigger for displaying supplemental content during the live programming. In another example, the TPT can be updated to refer to different content based on the outcome of the live event.

In another embodiment, the TPT remains unchanged as the program progresses. The timing of execution of specific interactive events is determined by the appearance of a trigger referencing a specific event. When the receiving apparatus 20 receives a trigger, the event referenced in the TPT is executed.

While some forms of the trigger can indicate that the time is right for the TDO to perform a certain action, a series of timed actions can be played out without a trigger. The TPT optionally provides timing information for various interactive events relative to "media time." Each item of interactive content has a timeline for its playout; an instant of time on this timeline is called media time. For example, a 30-minute program may have an interactive event at media time ten minutes and 41 seconds from the beginning of the program, or media time 10:41. The TPT can include an entry indicating the details of the event that is to occur at time 10:41. Once the receiving apparatus 20 determines the current timing relative to the start of the program, it can use the TPT to play out all subsequent events.

The reception apparatus 20 may determine the availability of an updated TPT by referring to a non-real-time (NRT) file in a File Delivery over Unidirectional Transport (FLUTE), such as a file version number indicated in a Transport Object Identifier (TOI). FLUTE is defined in RFC 3926, which is incorporated herein by reference in its entirety. In another embodiment, the reception apparatus 20 receives the updated TPT by posting a GET request to the TPT server 40 which remains pending until a new TPT is available. In another embodiment, the reception apparatus 20 periodically accesses a source of the TPT to determine whether a new TPT is available.

Likewise, compact triggers may be available via an Internet-based server. As with TPT updates, the receiving apparatus may post a GET request to the TPT server 40 which remains pending until a new triggers is available.

Figure 2:
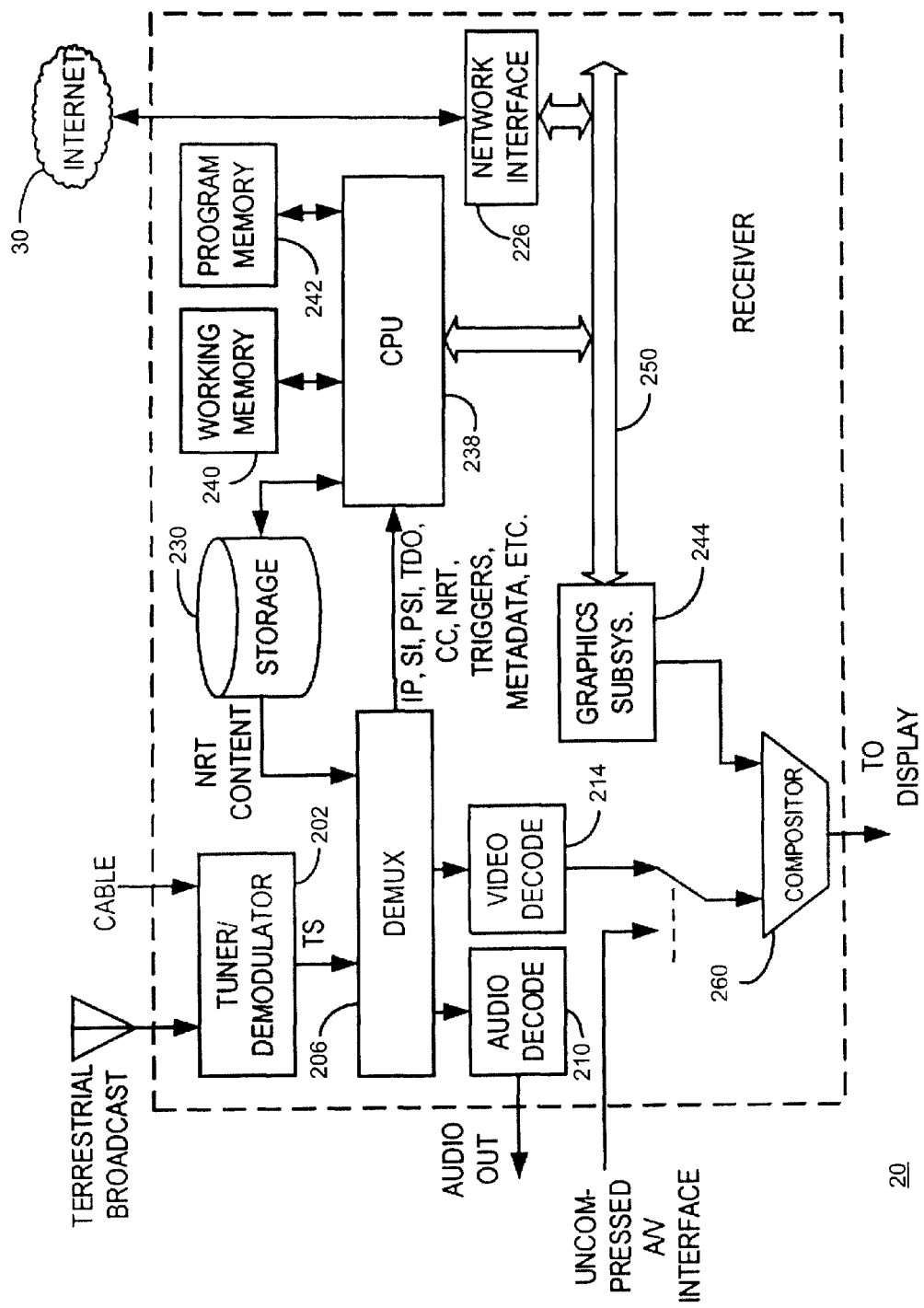
FIG. 2 is a block diagram of an exemplary reception apparatus.

FIG. 2 illustrates an embodiment of the reception apparatus 20. The reception apparatus 20 is a digital television receiver device that may be incorporated into a television set or a set top box. The reception apparatus 20 includes a tuner/demodulator 202, which receives content from one or more content sources such as a terrestrial broadcast or a cable television transmission. The reception apparatus 20 may also, or alternatively, receive content from a satellite broadcast. The tuner/demodulator 202 receives a transport stream (TS), which is demultiplexed by the demultiplexer 206 into audio and video (A/V) streams. The audio is decoded by an audio decoder 210 and the video is decoded by a video decoder 214. Further, uncompressed A/V data may be received via an uncompressed A/V interface (e.g., a HDMI interface) that can be selectively utilized.

In one embodiment, the TS includes ancillary information such as one or more of caption data, TDOs, triggers, TPTs, etc. However, in other embodiments, the A/V content and/or a subset or all of the ancillary information may be received via the Internet 30 and a network interface 226.

A storage unit 230 is provided to store NRT or Internet-delivered content such as Internet Protocol Television (IPTV). The stored content can be played by demultiplexing the content stored in the storage unit 230 by the demultiplexer 206 in a manner similar to that of other sources of content. The storage unit 230 may also store one or more TDOs, triggers, and TPTs acquired by the reception apparatus 20.

The reception apparatus 20 generally operates under control of at least one processor, such as CPU 238, which is coupled to a working memory 240, program memory 242, and a graphics subsystem 244 via one or more buses (e.g., bus 250). The CPU 238 receives closed caption data from the demultiplexer 206 as well as any other information such as TDO announcements and EPGs used for rendering graphics, and passes the information to the graphics subsystem 244. The graphics outputted by the graphics subsystem 244 are combined with video images by the compositor and video interface 260 to produce an output suitable for display on a video display.

Further, the CPU 238 operates to carry out functions of the reception apparatus 20 including the processing of related triggers, TDOs, TPTs, and browser operations. The browser operations include accessing a service specified by a URL given by the TDO or trigger. The CPU 238 further operates to execute script objects (control objects) contained in the TDO, its trigger(s), etc., using for example the DO Engine Although not illustrated in FIG. 2, the CPU 238 may be coupled to any one or a combination of the reception apparatus 20 resources to centralize control of one or more functions. In one embodiment, the CPU 238 also operates to oversee control of the reception apparatus 20 including the tuner/demodulator 202 and other television resources.

A more processor-centric view of the reception apparatus 20 is illustrated in FIG. 3. Memory and storage 230, 240, and 242 are depicted collectively as memory 310. Further, a processor 300 includes one or more processing units such as CPU 238. Similarly, the various demodulators, decoders, etc., that initially process digital television signals are collectively depicted as television receiver/tuner 320. The reception apparatus 20 further includes a remote controller 360 which communicates with a remote controller receiver interface 340. Additionally, the display 350 is connected to a display interface 330, which includes for example the uncompressed A/V interface and/or compositor 260, and is either a display integral to the reception apparatus 20 as in a television set or a connected display device as in the case where the reception apparatus 20 is integrated into a set-top box.

Memory 310 contains various functional program modules and data. The memory 310 stores the data used by the reception apparatus 20. The memory 310 within the reception apparatus 20 can be implemented using disc storage form as well as other forms of storage such as non-transitory storage devices including for example network memory devices, magnetic storage elements, magneto-optical storage elements, flash memory, core memory and/or other non-volatile storage technologies. When a TDO 316 is received, the TDO 316 is stored in the memory 310. The TDO execution is carried out by a DO Engine 312. The TDO, when executed by the DO Engine 312 presents supplemental content based on one or more triggers associated with the TDO and/or timing information stored in an associated TPT 318. The memory 310 also stores the TPT 318, which in one embodiment, defines one or more parameters for each trigger associated with the TDO.

Figure 4:
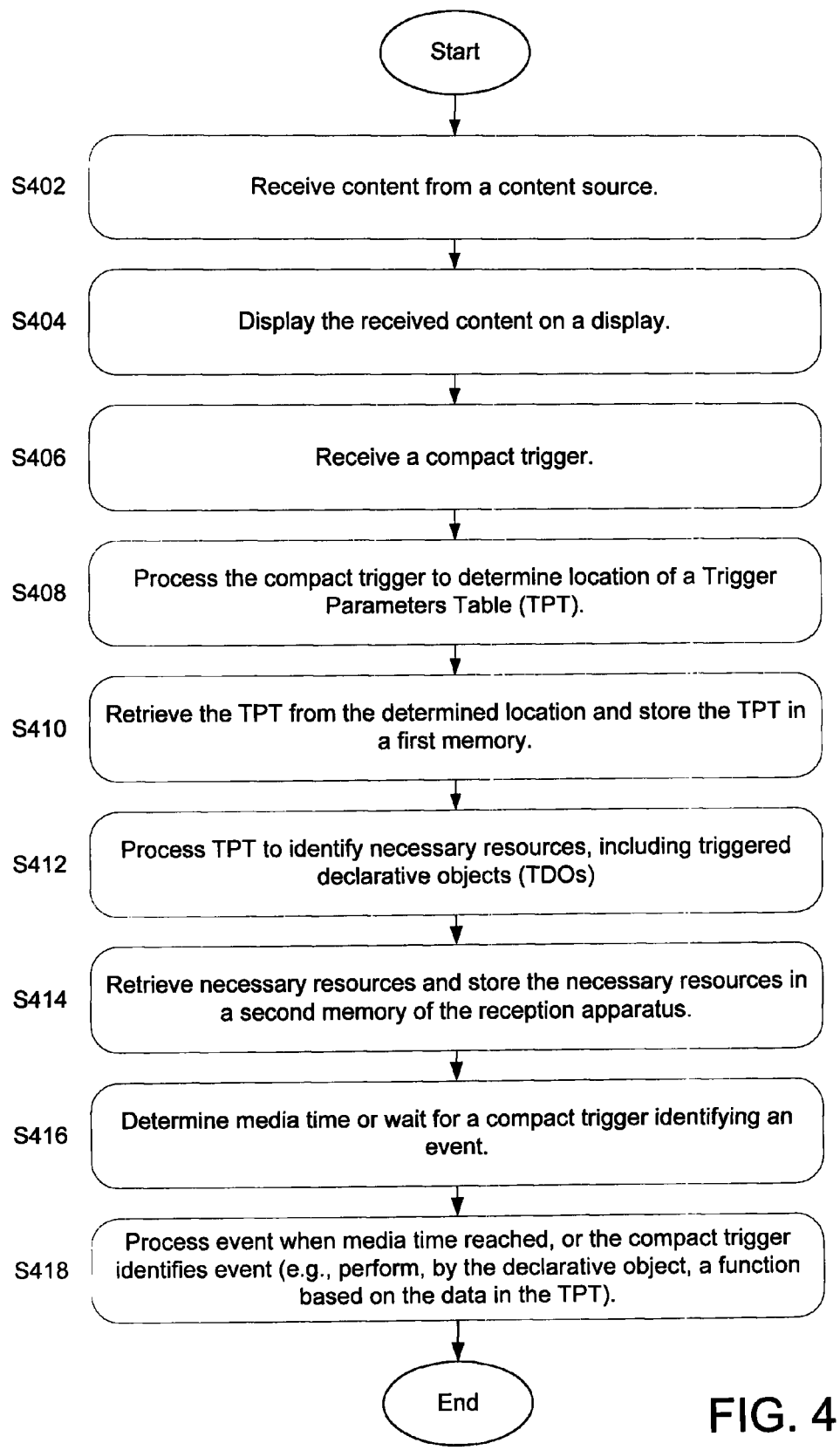
FIG. 4 illustrates a flow diagram of an exemplary method for processing a trigger.

FIG. 4 provides an overview of an exemplary method for processing triggers by, for example, the reception apparatus 20. In step S402, the reception apparatus 20 receives content (e.g., a television program) from a content source, such as the content source 10. The received content is presented to the user of the reception apparatus 20, in step S404. In step S406, the reception apparatus 20 receives a compact trigger associated with the received content. The reception apparatus 20 processes the compact trigger, in step S408, to determine a location of a TPT. In step S410, the reception apparatus 20 retrieves the TPT from the determined location and stores the TPT in a first memory of the reception apparatus 20. Further, in step S412, the reception apparatus 20 processes the retrieved and stored TPT to identify necessary resources, including triggered declarative objects (TDOs), associated with the TPT. In another embodiment, the location of one or more necessary resources are identified by one or more separate compact triggers. The determined necessary resources are subsequently retrieved and stored in a second memory of the reception apparatus 20 in step S414. In step S416, the reception apparatus 20 determines a media time or waits for a compact trigger identifying an event. When a media time is reached or a compact trigger identifies an event, in step S418, the reception apparatus processes an event such as performing an operation on a declarative object (e.g., a TDO) or having the declarative object perform a function based on the data in the TPT. It should be noted that the event processed in step S418 could correspond to either a type 1 command which the reception apparatus 20 (e.g., the DO Engine 312) knows how to execute or a type 2 command which the reception apparatus 20 passes to the TDO for execution. The first and second memories may correspond to the same memory such as different portions of the storage 230 or working memory 240, or discrete memories.

While triggers must be tightly time-synchronized to the audio/video content (e.g., to coincide with an ad boundary or scene change), the TPT can be delivered far in advance of the events it describes. Because the reception apparatus 20 can collect or download the TPT prior to its use over a period time such as seconds or minutes beforehand, use of the Internet for transport of the TPT becomes feasible.

In one embodiment, the TDO is downloaded from the TDO server 50 and the TPT is downloaded from the TPT server 40 in response to receiving one or more triggers associated with currently received content. For example, the reception apparatus 20 receives a first compact trigger that identifies the location of the TPT. The reception apparatus 20 downloads the TPT from the TPT server 40 in response to receiving the first compact trigger. Subsequently, the reception apparatus 20 processes the TPT and determines that a TDO is a necessary resource. In one embodiment, the reception apparatus 20 determines that the TDO is a necessary resource based on the inclusion of the TDO location in the TPT. In response, the reception apparatus 20 retrieves the TDO from the TDO server 50. In another embodiment, the reception apparatus 20 receives a second compact trigger that identifies the location of the TDO. It should be noted that in the case of receiving the second compact trigger, the order in which the triggers identify the locations of the TPT and TDO can be reversed.

In yet another embodiment, the reception apparatus 20 receives a compact trigger that identifies the location of the TDO. The reception apparatus 20 retrieves the TDO from the location identified by the compact trigger. Subsequently, after the TDO is executed, the TDO itself causes the download of an associated TPT.

As noted above, in one embodiment, once the Internet address (URL) of the TPT server is identified by the trigger, the reception apparatus 20 uses it to acquire the TPT. Upon reception of the TPT, various other referenced assets (e.g., TDOs, files, multimedia assets, etc.), are retrieved by the reception apparatus 20 and stored in memory for possible later use. Once the media time is known, the reception apparatus 20 begins processing the TPT to see if there are any "type 1" or "type 2" commands that are ready for execution.

In step S418, when the reception apparatus 20 receives a trigger associated with a type 1 command (e.g., to execute the TDO), the DO Engine 312, running on the processor 300, executes the TDO. When the reception apparatus 20 receives a trigger associated with a type 2 command in step S418, while the TDO is being executed, the reception apparatus 20 passes the trigger data to the TDO, which retrieves the at least one parameter associated with the trigger event stored in the TPT based on information (e.g., a tag value, media time, etc.) included in the trigger associated with the type 2 command. In another embodiment, the DO Engine 312 retrieves the at least one parameter and passes the retrieved at least one parameter to the TDO. The TDO performs a function based on the at least one parameter retrieved.

Figure 5:
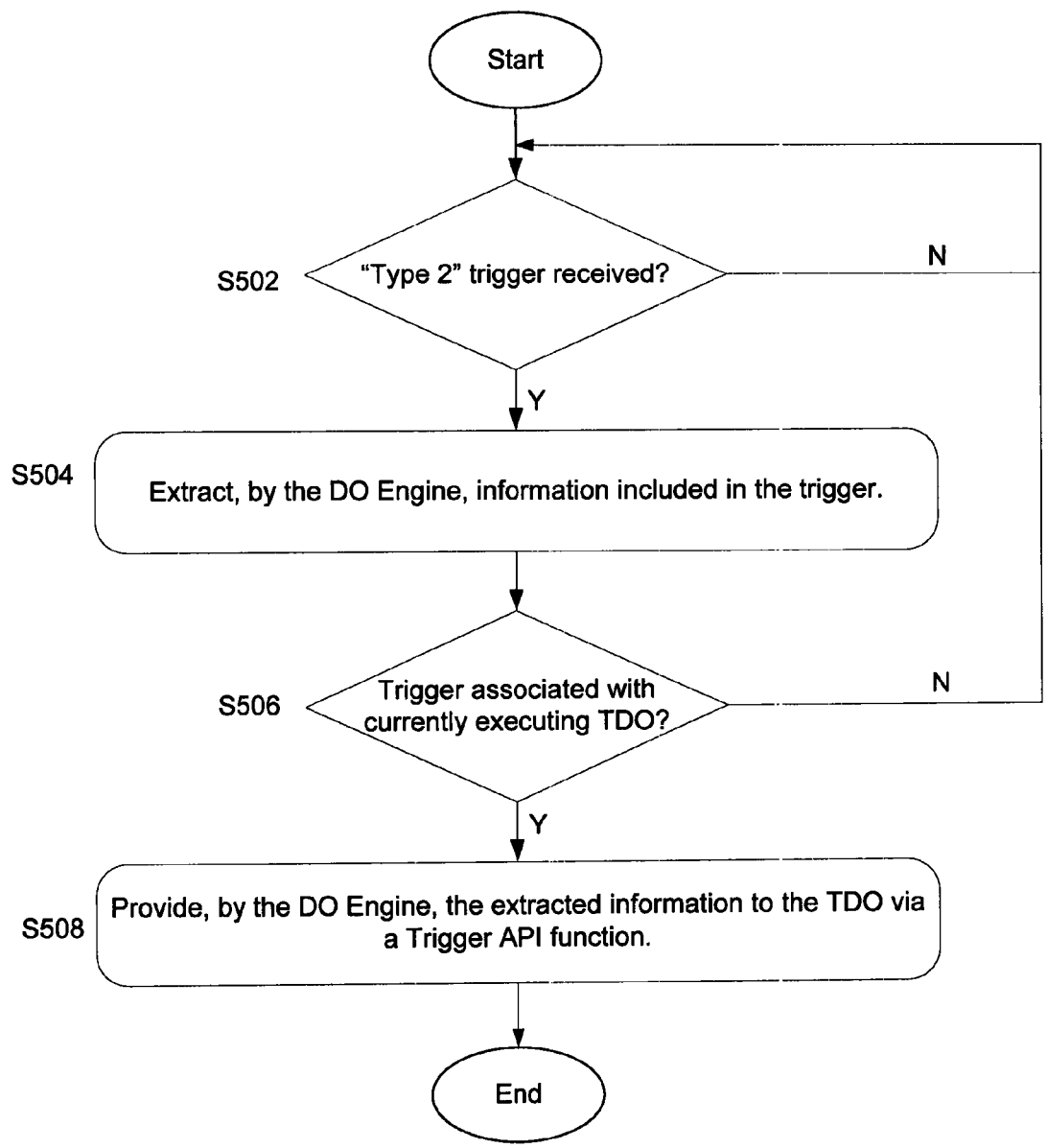
FIG. 5 illustrates a more detailed flow diagram of an exemplary method of a Declarative Object (DO) Engine for processing the trigger.

FIG. 5 is a more detailed illustration of an exemplary method for processing a trigger associated with a type 2 command (e.g., a "lifecycle" or "DO engine" command) using the DO Engine. In step S502, the DO Engine 312 determines whether a trigger of associated with the type 2 command (e.g., a "DO event" command) has been received. In one embodiment, the DO Engine 312 determines the type of the trigger based on whether the trigger specifies a command to be executed by the DO Engine 312. For example, if the trigger includes a tag value that has been assigned to a command to be executed by the DO Engine 312. In other embodiments, the DO Engine 312 determines whether a trigger is associated with a type 1 or type 2 command based on information included in the TPT entry. For example, the TPT entry itself can including information specifying that it corresponds to a type 1 or type 2 command. In another example, the DO Engine 312 determines whether the TPT entry includes a DO Engine command.

When the trigger associated with a type 2 command is determined to be received in step S502, the DO Engine extracts information included in the trigger in step S504. In one embodiment, the trigger information includes one or a combination of a TDO identifier (e.g., a TDO URL) and a reference to a TPT and/or one or more table entries containing parameters and data associated with this trigger event. The TDO identifier can be any unique identifier such as a reference number, URL, symbol, or other representation. The reference can be tag value such as an index number (small integer) or a media time. In some embodiments, the trigger only includes the reference information.

In step S506, the DO Engine determines whether the trigger is associated with a currently executing TDO based on the extracted TDO identifier. When, the trigger is determined to be associated with the currently executing TDO, in step S508, a reference (e.g., a tag value) extracted from the trigger is provided to the TDO, via a trigger application program interface (API) function. The tag value may be extracted with the TDO identifier or at any time prior to the tag value being provided to the TDO.

When the trigger is determined not to be associated with the currently executing TDO, in one embodiment, the trigger is discarded and the DO Engine 312 returns to step S502 and waits for receipt of the next trigger associated with the type 2 command. Alternatively, the DO Engine 312 may temporarily suspend, or terminate, the currently executed TDO and execute a TDO associated with the trigger before proceeding the step S508. For example, in one embodiment, when the trigger is determined not to be associated with the currently executing TDO, the currently executing TDO is terminated or suspended and the TDO associated with the trigger is executed. When the currently executing TDO is suspended, execution of the suspended TDO is resumed when a trigger associated with the suspended TDO is later received.

Figure 6A:
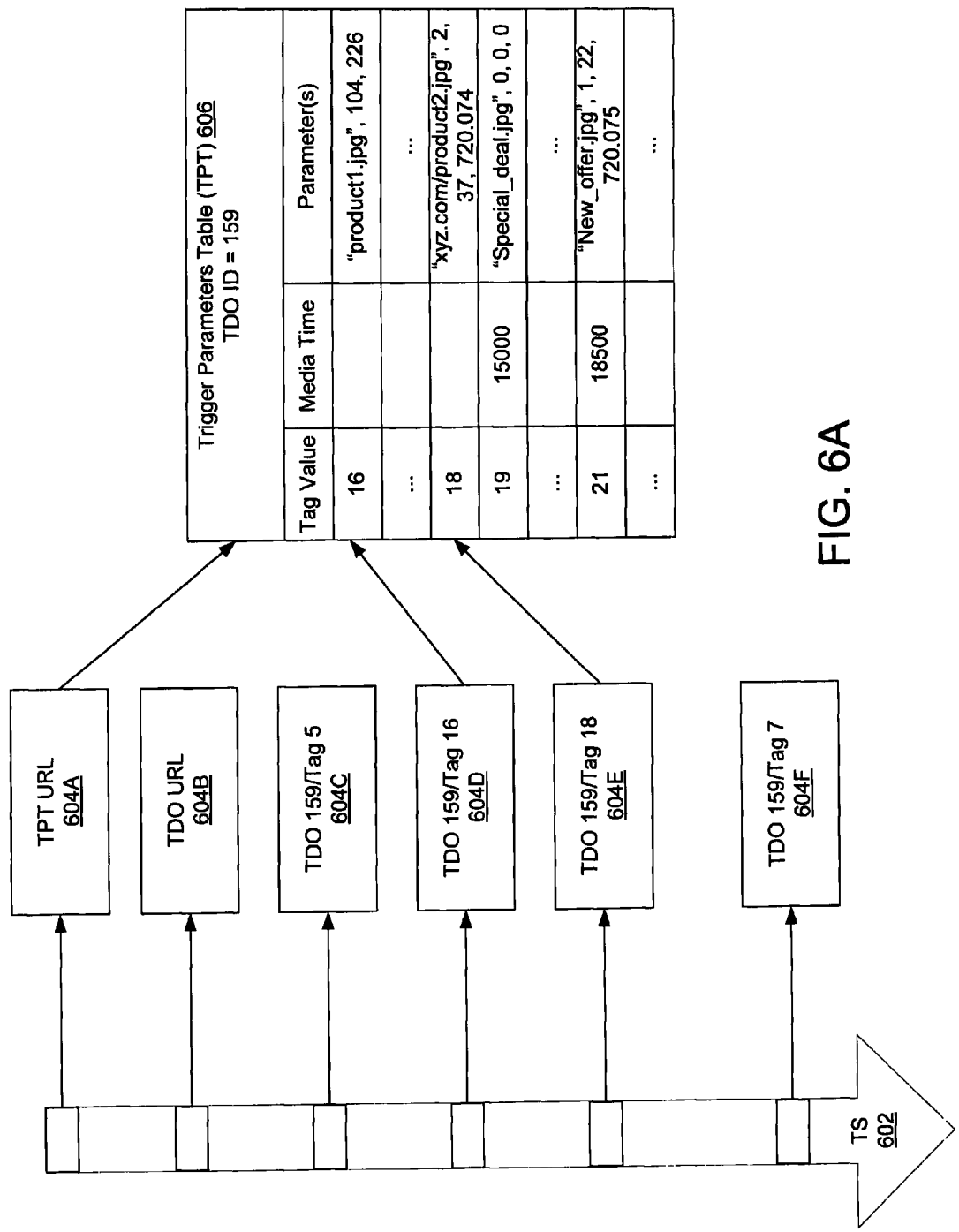
FIGS. 6A and 6B illustrate exemplary triggers and associated TPTs.

FIG. 6A illustrates a TPT 606 which, according to one embodiment, only contains parameters for a particular TDO (e.g., TDO 159). In one embodiment, prior to executing the TDO whose ID is 159, the reception apparatus 20 downloads the TDO itself along with associated files, one of which is the TPT. The TDO has script-level access to the TPT. As noted above, depending on the embodiment, the TPT is downloaded prior to or after the TDO, the TDO is downloaded from a location identified by the TPT, the TPT is downloaded from a location identified by the TDO, etc.

A TS 602 carrying content is associated with a plurality of events identified by triggers 604A-604F. The triggers 604A-604C and 604F are associated with type 1 commands; and triggers 604D and 604E are associated with type 2 commands. The triggers associated with type 1 commands are processed by the DO Engine 312, while the triggers associated with type 2 commands are processed by a TDO.

In FIG. 6A, the reception apparatus 20 receives the triggers 604A and 604B, which identify the locations of the TPT 606 and TDO 159, respectively. The reception apparatus 20 retrieves and stores the TPT 606 and TDO 159 based on the identified locations. It should be noted that the TPT 606 and TDO 159 can be received in any order. Further, in other embodiments, the TPT 606 identifies the location of the TDO 159 or the TDO 159 identifies the location of the TPT 606.

Each of triggers 604D and 604E is associated with a row (or element) in the TPT, such as TPT 606, and includes a reference to a specific entry in the TPT using, for example, a tag value. The DO Engine 312 extracts a tag value from each of the triggers 604D and 604E, which are associated with type 2 commands, and provides the extracted tag value to a currently executed TDO. The TDO uses the tag value to determine at least one parameter that is associated with the trigger. Then, as noted above, the TDO performs a function based on the retrieved at least one parameter. It should be noted that the reference to the TPT entry is not limited to a tag value and can be any symbol or representation that can be used to reference an entry in the TPT.

Further, in one embodiment, predetermined tag values (e.g., tag values below 16) are associated with predetermined commands to be executed by the DO Engine 312. Accordingly, certain triggers such as a subset or all triggers associated with type 1 commands need not be associated with a row (or element) in the TPT. For example, when the reception apparatus 20 receives the trigger 604C with a tag value of 5, the reception apparatus 20 executes a TDO 159 that is stored in the reception apparatus 20. In another example, when the reception apparatus 20 receives a trigger 604F with a tag value of 7, the DO Engine 312 terminates, or suspends, the TDO 159. Accordingly, in these examples, the tag value 5 is specified as an "Execute" command and the tag value 7 is specified as a "Terminate" or "Suspend" command.

In one embodiment, the predetermined tag values are specified in a standard as commands to be executed by the DO Engine 312. The specified basic trigger types to be executed by the DO Engine 312 itself include "Register," "Execute," "Suspend," "Resume," and "Terminate." Any other tag values, symbols, or representations may be reserved for DO Engine commands. Further, in other embodiments, the triggers associated with type 1 commands refer to entries in the TPT 606 or a separate TPT to provide any parameters required to execute a command. For example, when the trigger is associated with a type 1 command that is "load TDO," the trigger includes the location (e.g., a URL), or a reference to the location (e.g., entry in a TPT) of the TDO so that it can be acquired by the reception apparatus 20. That is, in other embodiments, a trigger associated with a type 1 command may include a reference to an entry in a TPT that identifies the location of a TDO to be retrieved and executed, as illustrated for example in FIG. 6B.

Further, as illustrated in FIG. 6A, the TPT 606 includes TPT entries (e.g., tag values 19 or 21) that are utilized by the TDO 606 when the specified media times have arrived. The arrival of a specified media time may be determined based on the receipt of a trigger including the specified media time or by the reception apparatus 20. For example, the TDO 159 monitors the current media time of the received content and processes parameters when the media time equals 15000 and 18500, respectively, Alternatively, the DO Engine 312 monitors the current media time and passes the tag value to the TDO 159 at the appropriate time.

In one embodiment, the media time represents the number of milliseconds that have elapsed in the received content. However, any other unit of time could be used to represent the media time. Further, any one or a plurality of the triggers 604A-604F can include additional parameters such as media time information for use by the reception apparatus 20, DO Engine 312, and/or TDO 159, as a reference point for determining the current media time in the received content.

Figure 6B:
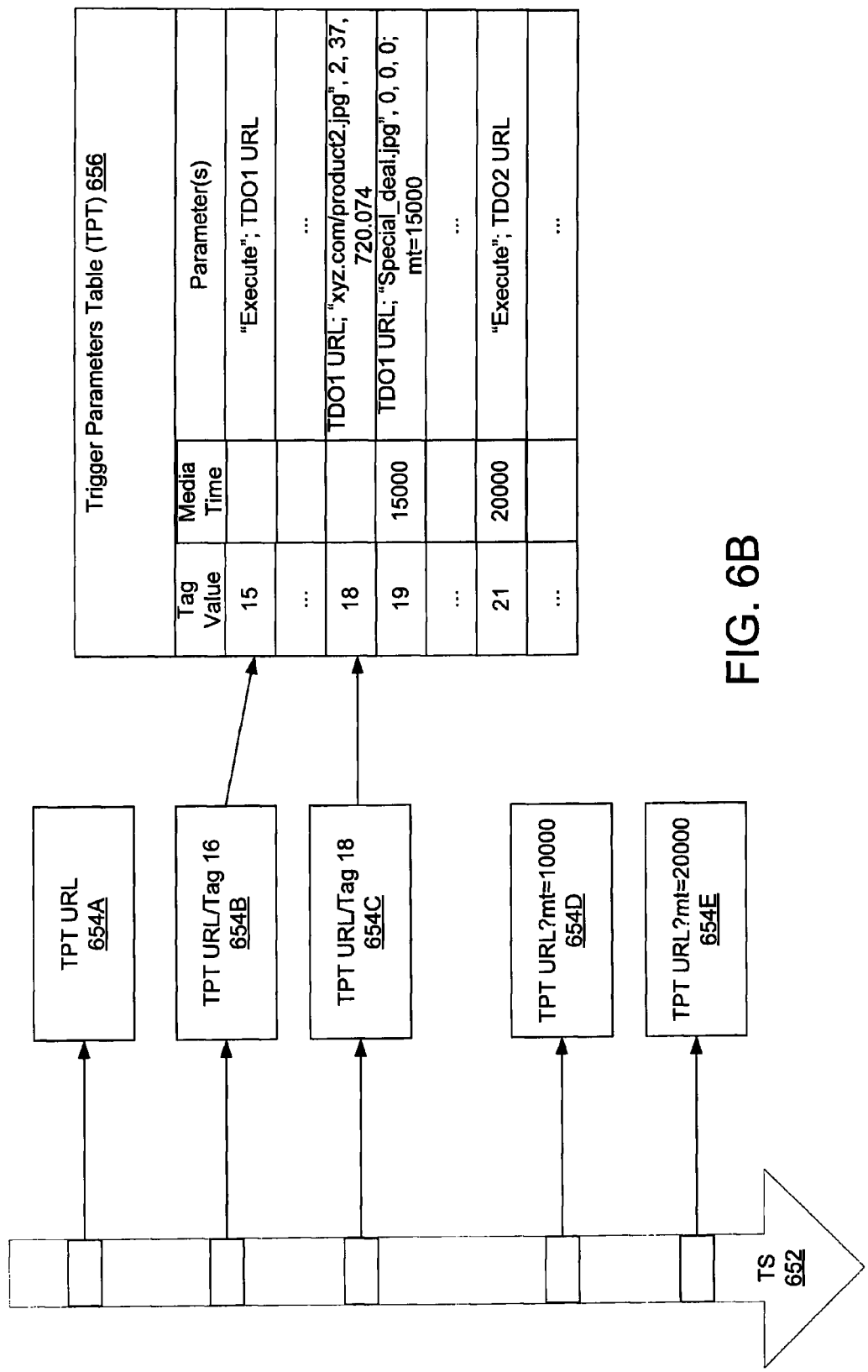

FIG. 6B illustrates an exemplary TPT that contains parameters for triggers associated with type 1 and type 2 commands. It should be noted that separate TPTs for the type 1 and type 2 commands could alternatively be provided. Triggers 654A, 654B, 654D, and 654E are associated with type 1 commands; and trigger 654C is associated with a type 2 command. As described above, in one embodiment, the reception apparatus 20 retrieves the TPT 656 based on the trigger 654A, which identifies the location of the TPT 656. Further, the reception apparatus 20 processes the TPT 656 and determines that necessary resources for the TPT include TDO1 and TDO2. Subsequently, the reception apparatus 20 retrieves the TDO1 and TDO2 based on the locations identified in the TPT 656.

When the reception apparatus receives trigger 654B, in one embodiment, the DO Engine 312 determines that the trigger is associated with a type 1 command based on the tag value falling within a predetermine range of tag values (e.g., tag value less than 16), as described above. In another embodiment, the DO Engine 312 determines that the trigger is associated with the type 1 command based on the presence of a command such as "Execute" or other identifying information in the corresponding TPT entry. The reception apparatus 20 executes the TDO1 in response to receiving the trigger 654B.

When the reception apparatus 20 receives the trigger 654C, the DO Engine 312 extracts the tag value from the trigger 654C and determines that the trigger is associated with a type 2 command. In one embodiment, the DO Engine 312 determines that the trigger 654C is associated with a type 2 command based on the tag value falling outside of a predetermined range (e.g., tag value is 16 or greater). In other embodiments, the DO Engine 312 makes the determination based on information included in the TPT 656. The DO Engine 312 provides the extracted tag value to the TDO1. The TDO1 uses the tag value to determine at least one parameter that is associated with the trigger. Further, the TDO1 performs a function based on the at least one parameter.

As illustrated in FIG. 6B, the reception apparatus 20 receives triggers 654D and 654E. These triggers provide the reception apparatus 20, DO Engine 312, and/or a TDO a reference point for determining the current media time in the received content. The DO Engine 312 and/or an executing TDO monitors the current media time to determine whether any entries in the TPT 656 should be processed. For example, when the DO Engine 312 determines that the current media time is 20000, the DO Engine executes TDO2 in accordance with the TPT entry with the tag value 21. In another example, when the DO Engine 312 or TDO1 determines that the current media time is 15000, the TDO1 is caused to process, or processes, the parameters included in the TPT entry with the tag value 19. In another embodiment, the media time information included in the trigger itself is used to identify a TPT entry.

The TPT 606 illustrated in FIGS. 6A and 6B contains references to image files. As illustrated in FIG. 6A, one graphic is associated with each tag value or media time. However, the TPTs 606 and 656 are not so limited and can refer to one or a combination of different media types such as audio, video, an image, and/or one or more interactive elements. As noted above, predetermined tag values (e.g., below 16) may be specified in a standard as commands to be executed by the DO Engine. Therefore, in one embodiment, the TPT only contains entries for tag values 16 and above. In another embodiment, TPT entries are provided for all tag values.

For example, when the reception apparatus 20 receives a trigger 604D with a tag value of 16, the DO Engine 312 passes the tag value 16 to the TDO 159, which is currently executing. The DO Engine 312 passes the tag value by calling a Trigger API function, which is supported by the DO Engine 312, and delivers the tag value to the TDO 159. The Trigger API function may be included in the DO Engine 312 or a separate programming component of the reception apparatus 20. The TDO 159 accesses the TPT 606 and determines the parameters associated with the trigger are "product1.jpg" and the numbers 104 and 226. In one embodiment, the function performed by the TDO 159 based on the determined parameters includes rendering the image file "product1.jpg" at location X, Y (104, 226) on the display 350.

The TPT, however, is not limited to including information on image files and position, and can include other parameters such as (as mentioned) a media time that designates the timing of any given interactive elements, validity information for defining an expiration date of the trigger, capability codes that allow the reception apparatus 20 to determine whether it is capable of providing the supplemental content associated with the TPT or a specific TPT entry, etc. The TPT could include a URL the TPT could use to fetch an updated parameter set from an Internet server, where the data set represents a weather report, sports scores, player statistics, or any other time-sensitive data. As another example, the TPT may include one or more capability codes that indicate the TPT can only be processed by a reception apparatus supporting "ATSC 2.7+," a minimum requirement code such as support for certain media formats and decoders, essential and non-essential capabilities, etc.

Note that, in one embodiment, the DO Engine 312 itself does not try to interpret anything carried in a given row of the TPT instance, such as the row identified with Tag Value 21 in TPT 606. The information contained in the TPT instance is known and interpretable only to the TDO it is designed to work with. Therefore, the number and types of parameters included in a TPT may be customizable based on the requirements of an associated TDO. In other words, the TPT is not limited to including a predetermined set of parameters and may contain any parameter that is required by a particular TDO.

Figure 7:
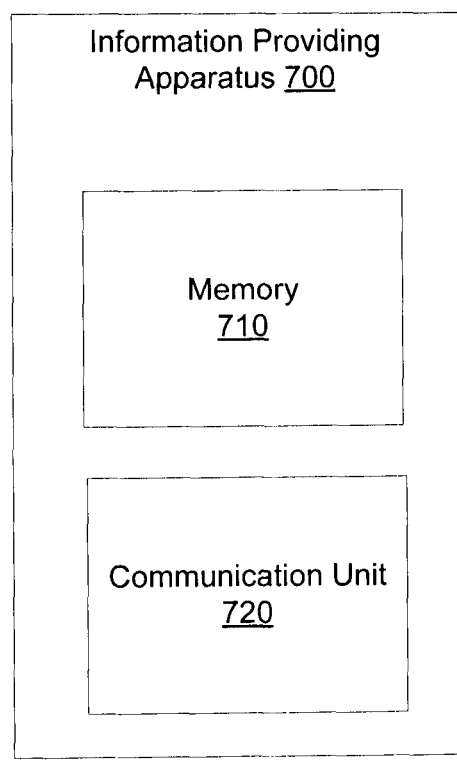
FIG. 7 is a block diagram of an exemplary information providing apparatus.

FIG. 7 illustrates an information providing apparatus 700, which may be included in the content source 10, TPT server 40, TDO server 50, ACR system 60, or a stand-alone device. As illustrated in FIG. 7, the information providing apparatus 700 includes a memory 710 and a communication unit 720. The memory 710 can be implemented using disc storage form as well as other forms of storage such as non-transitory storage devices including for example network memory devices, magnetic storage elements, magneto-optical storage elements, flash memory, core memory and/or other non-volatile storage technologies. Further, the communication unit 720 can be implemented using any one or a combination of a terrestrial broadcast transmitter, a cable broadcast transmitter, a satellite uplink transmitter, a network interface (e.g., WLAN card, Ethernet card, etc.), or the like.

The memory 710 is configured to store a TPT, which is associated with a TDO and includes at least one parameter associated with a trigger event. The communication unit 720 provides the TPT stored in the memory 710 to the reception apparatus 20. For example, the communication unit 720 provides the TPT to the reception apparatus 20 via the TS or the Internet.

Figure 8:
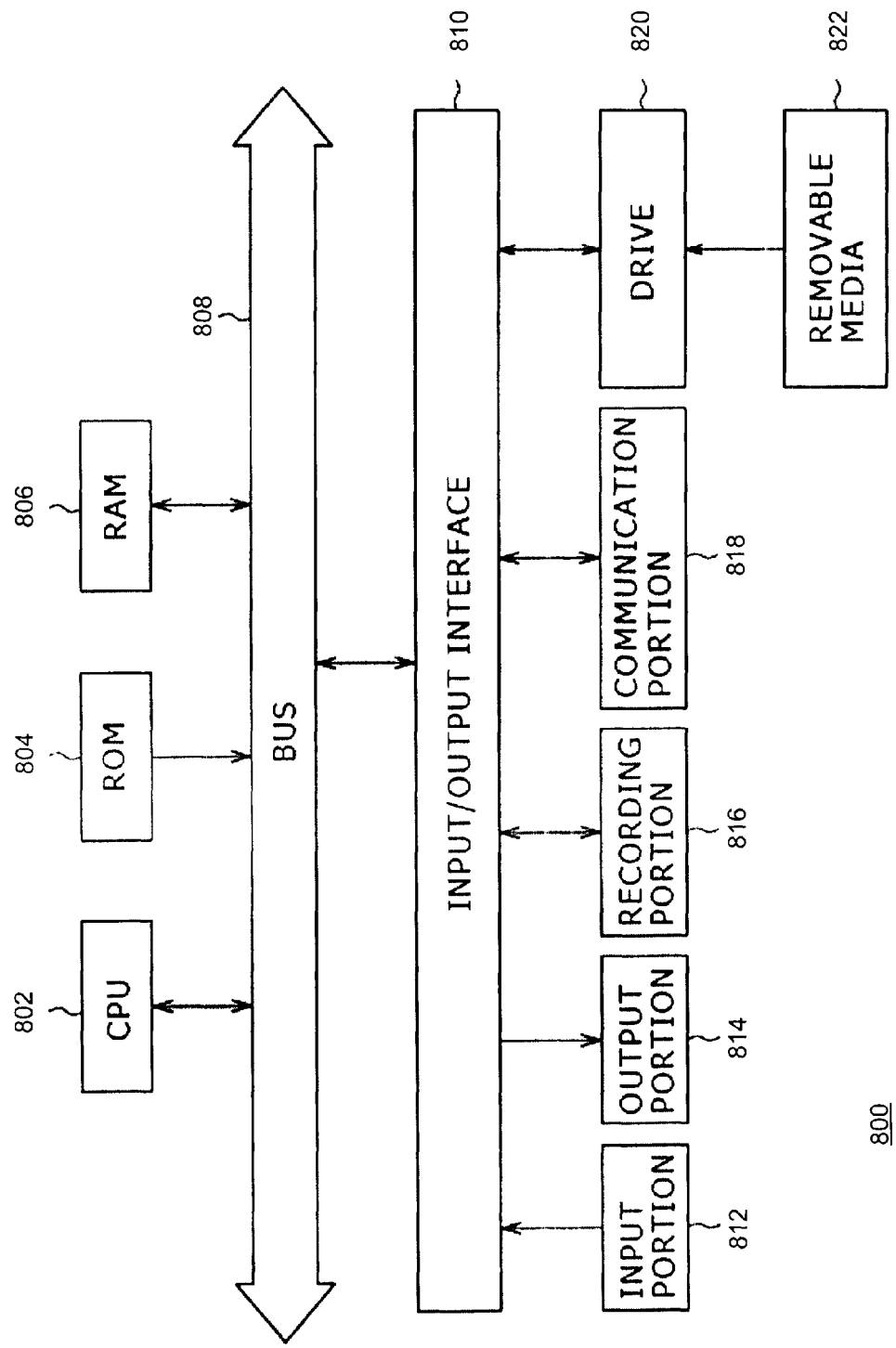
FIG. 8 is an exemplary computer.

FIG. 8 is a block diagram showing an example of a hardware configuration of a computer 800 configured to function as any one or a combination of the content source 10, reception apparatus 20, TPT server 40, TDO server 50, ACR system 60, and information providing apparatus 700.

As illustrated in FIG. 8, the computer 800 includes a central processing unit (CPU) 802, read only memory (ROM) 804, and a random access memory (RAM) 806 interconnected to each other via one or more buses 808. The one or more buses 808 is further connected with an input-output interface 810. The input-output interface 810 is connected with an input portion 812 formed by a keyboard, a mouse, a microphone, remote controller, etc. The input-output interface 810 is also connected to a output portion 814 formed by an audio interface, video interface, display, speaker, etc.; a recording portion 816 formed by a hard disk, a non-volatile memory, etc.; a communication portion 818 formed by a network interface, modem, USB interface, fire wire interface, etc.; and a drive 820 for driving removable media 822 such as a magnetic disk, an optical disk, a magneto-optical disk, a semiconductor memory, etc.

According to one embodiment, the CPU 802 loads a program stored in the recording portion 816 into the RAM 806 via the input-output interface 810 and the bus 808, and then executes a program configured to provide the functionality of the one or combination of the content source 10, reception apparatus 20, TPT server 40, TDO server 50, ACR system 60, and information providing apparatus 700

The various processes discussed above need not be processed chronologically in the sequence depicted as flowcharts; the steps may also include those processed parallelly or individually (e.g., in paralleled or object-oriented fashion).

Also, the programs may be processed by a single computer or by a plurality of computers on a distributed basis. The programs may also be transferred to a remote computer or computers for execution.

Furthermore, in this specification, the term "system" means an aggregate of a plurality of component elements (apparatuses, modules (parts), etc.). All component elements may or may not be housed in a single enclosure. Therefore, a plurality of apparatuses each housed in a separate enclosure and connected via a network are considered a network, and a single apparatus formed by a plurality of modules housed in a single enclosure are also regarded as a system.

Also, it should be understood that this technology when embodied is not limited to the above-described embodiments and that various modifications, variations and alternatives may be made of this technology so far as they are within the spirit and scope thereof.

For example, this technology may be structured for cloud computing whereby a single function is shared and processed in collaboration among a plurality of apparatuses via a network.

Also, each of the steps explained in reference to the above-described flowcharts may be executed not only by a single apparatus but also by a plurality of apparatuses in a shared manner.

Furthermore, if one step includes a plurality of processes, these processes included in the step may be performed not only by a single apparatus but also by a plurality of apparatuses in a shared manner.

Numerous modifications and variations of the present invention are possible in light of the above teachings. It is therefore to be understood that within the scope of the appended claims, the invention may be practiced otherwise than as specifically described herein.

The invention claimed is:

1. A method of a reception apparatus for processing a table, comprising:
    downloading, by circuitry of the reception apparatus, the table, the table including at least one parameter and an identifier associated with the at least one parameter;
    storing the table in a memory of the reception apparatus;
    processing the table to determine download information for at least one necessary resource identified in the table, the at least one necessary resource including an application;
    downloading the at least one necessary resource, including the application, based on the download information included in the table;
    receiving control information, the control information including the identifier associated with the at least one parameter;
    retrieving the at least one parameter associated with the identifier from the table using the identifier included in the control information; and
    causing, by the circuitry, the application to perform a function based on the retrieved at least one parameter.

2. The method according to claim 1, further comprising:
    receiving content via at least one of a satellite broadcast, a cable television transmission, a terrestrial television broadcast, and the Internet, the content being associated with the application; and
    outputting the received content for display.

3. The method according to claim 1, wherein the step of downloading the table comprises:
    downloading the table from a satellite broadcast, a cable television transmission, a terrestrial television broadcast, or the Internet.

4. The method according to claim 1, wherein the step of receiving the control information comprises:
    receiving the control information via a satellite broadcast, a cable television transmission, a terrestrial television broadcast, or the Internet.

5. The method according to claim 1, further comprising:
    executing, by the circuitry of the reception apparatus, a declarative object (DO) Engine that executes the application stored in the memory of the reception apparatus.

6. The method according to claim 5, further comprising:
    extracting, by the DO Engine, the identifier from the received control information; and
    providing, by the DO Engine, the extracted identifier to the application.

7. The method according to claim 5, wherein the table does not include identifier values reserved for commands executed by the DO Engine.

8. The method according to claim 1, wherein
    the table identifies an image associated with the identifier.

9. The method according to claim 1, wherein
the control information includes an application identifier and a table entry identifier, and
the table entry identifier is associated with the at least one parameter.

10. The method according to claim 1, wherein the control information includes a media time.

11. A non-transitory computer-readable storage medium having embedded therein instructions, which when executed by a computer, cause the computer to perform a method of a reception apparatus for processing a table, the method comprising:
 downloading, by the computer, a table, the table including at least one parameter and an identifier associated with the at least one parameter;
 storing the table in a memory of the reception apparatus;
 processing the table to determine download information for at least one necessary resource identified in the table, the at least one necessary resource including an application;
 downloading the at least one necessary resource, including the application, based on the download information included in the table;
 receiving control information, the control information including the identifier associated with the at least one parameter;
 retrieving the at least one parameter associated with the identifier from the table using the identifier included in the control information; and
 causing, by the computer, the application to perform a function based on the retrieved at least one parameter.

12. A reception apparatus, comprising:
 a memory configured to store a table and an application; and
 circuitry configured to
  download the table, the table including at least one parameter and an identifier associated with the at least one parameter;
  process the table to determine download information for at least one necessary resource identified in the table, the at least one necessary resource including the application;
  download the at least one necessary resource, including the application, based on the download information included in the table; and
  receive control information, the control information including the identifier associated associated with the at least one parameter;
  retrieve the at least one parameter associated with the identifier from the table in response to the control information; and
  cause the application to perform a function based on the retrieved at least one parameter.

13. The reception apparatus according to claim 12, wherein the circuitry is configured to
 receive content via at least one of a satellite broadcast, a cable television transmission, a terrestrial television broadcast, and the Internet, the content being associated with the application; and
 output the received content for display.

14. The reception apparatus according to claim 12, wherein the circuitry is configured to download the table from a satellite broadcast, a cable television transmission, a terrestrial television broadcast, or the Internet.

15. The reception apparatus according to claim 12, wherein the circuitry is configured to receive the control information via a satellite broadcast, a cable television transmission, a terrestrial television broadcast, or the Internet.

16. The reception apparatus according to claim 12, wherein the circuitry is configured to execute a declarative object (DO) Engine that executes the application stored in the memory.

17. The reception apparatus according to claim 16, wherein
 the DO Engine is configured to extract the identifier from the received control information, and to provide the extracted identifier to the application.

18. The reception apparatus according to claim 16, wherein the table does not include identifier values reserved for commands executed by the DO Engine.

19. The reception apparatus according to claim 12, wherein
 the table identifies an image associated with the identifier.

20. The reception apparatus according to claim 12, wherein
 the control information includes an application identifier and a table entry identifier, and
 the table entry identifier is associated with the at least one parameter.

21. The reception apparatus according to claim 12, wherein the control information includes a media time.

22. The reception apparatus according to claim 12, wherein the size of the control information is reduced by referring to the identifier in the table.

23. A television set comprising the reception apparatus according to claim 12.

24. An information providing apparatus, comprising:
 a memory configured to store a table, the table including at least one parameter, an identifier associated with the at least one parameter, and download information for at least one necessary resource that includes an application; and
 circuitry configured to provide the table to a reception apparatus, which processes the table to determine the at least one necessary resource identified in the table and downloads the at least one necessary resource, including the application, based on the download information included in the table, wherein
 the application performs a function based on the at least one parameter retrieved from the table in response to received control information.

* * * * *

UNITED STATES PATENT AND TRADEMARK OFFICE
CERTIFICATE OF CORRECTION

PATENT NO. : 9,554,175 B2
APPLICATION NO. : 13/490216
DATED : January 24, 2017
INVENTOR(S) : Mark Eyer It is certified that error appears in the above-identified patent and that said Letters Patent is hereby corrected as shown below:

In the Claims

At Column 17, Line 49, replace "associated associated" with --associated--

Signed and Sealed this
Fifteenth Day of August, 2023

Katherine Kelly Vidal
*Director of the United States Patent and Trademark Office*